(12) United States Patent
Mannella et al.

(10) Patent No.: US 6,550,822 B2
(45) Date of Patent: Apr. 22, 2003

(54) THREADED COUPLING WITH WATER EXCLUSION SEAL SYSTEM

(75) Inventors: Eugene J. Mannella, Richmond, TX (US); James L. Peterson, Terrytown, LA (US)

(73) Assignees: G. B. Tubulars, Inc., Houston, TX (US); Shell Oil Company, Houston, TX (US)

( * ) Notice: Subject to any disclaimer, the term of this patent is extended or adjusted under 35 U.S.C. 154(b) by 0 days.

(21) Appl. No.: 09/843,493

(22) Filed: Apr. 25, 2001

(65) Prior Publication Data

US 2002/0158469 A1 Oct. 31, 2002

(51) Int. Cl.[7] .................................................. F16L 25/00
(52) U.S. Cl. .......................... 285/333; 285/334; 285/355
(58) Field of Search ................................. 285/333, 334, 285/355, 390

(56) References Cited

U.S. PATENT DOCUMENTS

| | | |
|---|---|---|
| 2,320,107 A | 5/1943 | Speckert |
| 2,779,420 A | 1/1957 | Stevenson |
| 2,857,184 A | 10/1958 | Mancusi |
| 3,011,803 A | 12/1961 | Buckner et al. |
| 3,606,348 A | 9/1971 | Taylor |
| 3,687,494 A | 8/1972 | Graff |
| 4,042,020 A | 8/1977 | Wellstein |
| 4,161,043 A | 7/1979 | Flores |
| 4,174,846 A | 11/1979 | Scott |
| 4,486,693 A * | 12/1984 | Raulins et al. ............... 285/334 |
| 4,595,219 A * | 6/1986 | Lenze et al. ................. 285/333 |
| 4,601,491 A * | 7/1986 | Bell et al. .................... 285/334 |
| 4,706,997 A | 11/1987 | Carstensen |
| 4,708,038 A | 11/1987 | Hellnick et al. |
| 4,846,507 A | 7/1989 | Geary |
| 4,875,713 A | 10/1989 | Carstensen |
| 4,878,285 A | 11/1989 | Carstensen |
| 4,988,127 A | 1/1991 | Cartensen |
| 5,015,017 A | 5/1991 | Geary |
| 5,263,748 A | 11/1993 | Carstensen |
| 5,343,798 A | 9/1994 | Meisinger et al. |
| 5,355,961 A | 10/1994 | Gariepy et al. |
| 5,851,037 A | 12/1998 | Bridges |
| 5,944,319 A | 8/1999 | Kohlman |

FOREIGN PATENT DOCUMENTS

| | | | | |
|---|---|---|---|---|
| GB | 0800348 | * | 8/1958 | ................. 285/333 |
| GB | 1223170 | * | 2/1971 | ................. 285/333 |

* cited by examiner

Primary Examiner—Lynne H. Browne
Assistant Examiner—Aaron M Dunwoody
(74) Attorney, Agent, or Firm—Trop, Pruner & Hu, P.C.

(57) ABSTRACT

An improved coupling for joining together tubular sections is disclosed. The coupling includes a water exclusion seal which is a pressure energized elastomeric seal positioned in a groove near each end of the coupling to form a radial seal between the unthreaded area at each end of the coupling and the unthreaded cylindrical area adjacent each end of the tubular section. A thread compound relief groove adjacent each seal groove has sufficient volume for thread compound that is squeezed from the threads during or after make-up.

14 Claims, 1 Drawing Sheet

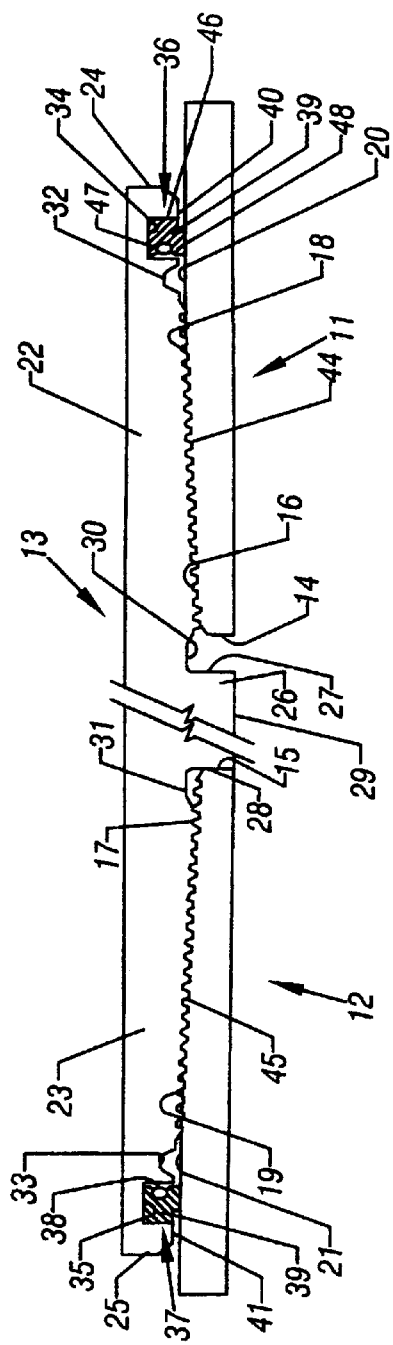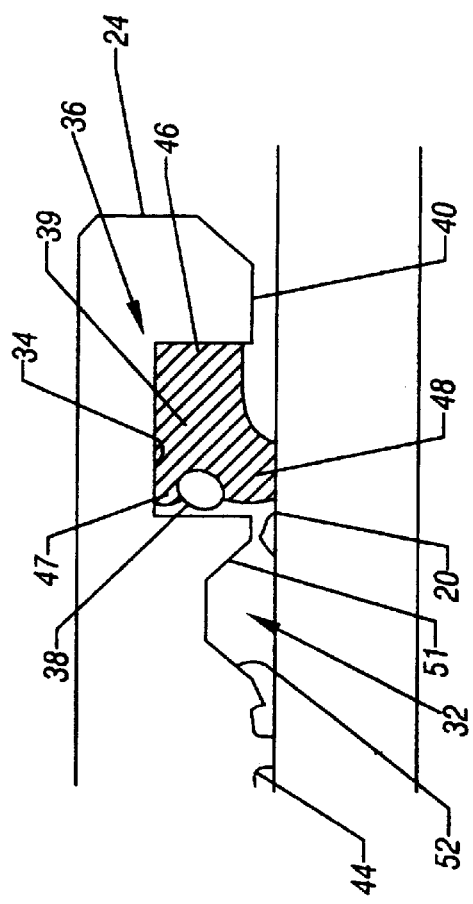

THREADED COUPLING WITH WATER EXCLUSION SEAL SYSTEM

BACKGROUND OF THE INVENTION

1. Field of the Invention

The present invention relates generally to threaded couplings used for joining sections of tubing, casing, line pipe or other tubular sections forming long strings of pipe used in drilling and producing oil and gas. More particularly, the invention relates to a threaded coupling for joining tubulars used in offshore production of oil and gas, designed to reduce or prevent corrosion from free exchange of seawater into the connection.

2. Description of Related Art

In the search for oil and gas reserves, major oil companies have increasingly moved to deep water drilling environments. Early success in deep water has demonstrated the existence of large oil and gas fields. However, the deep water drilling environment has presented new industry challenges that make these endeavors both risky and expensive.

Tubular strings running from a drilling rig or production platform to the sea floor are known as risers. These are the conduits for bringing oil and gas to the surface. Each riser string consists of individual, 40-foot long tubular sections joined together with a variety of threaded couplings. Other installations use specially rolled longer tubular sections (i.e., greater than 40 feet in length) or welded, double joint assemblies having connections at both ends. On the rig, each tubular section is raised in the derrick, lowered below the deck and held at the floor with a threaded coupling facing up. The next tubular section is raised into the derrick and stabbed into the coupling. After successful stabbing, the tubular section is screwed into the coupling. All assembled tubular sections are then lowered in preparation for the next tubular section. The process continues, one tubular section at a time, until the string connects to the well at the sea floor.

Several types of riser strings are common. One type is a drilling riser that is temporary and only in service for a few weeks or months. Another is a production riser used for producing oil and gas. Production risers can be in service for many years. Other types of risers include intervention and work-over risers.

While in service, riser strings are exposed to a variety of cyclic loads and the corrosive effects of seawater. These strings are subject to tension, compression, bending, and pressure (internal and external) loads commonly referred to as cyclic loading. In deep water, drilling rigs and production platforms are floating vessels. While maintained in a relatively stationary location through various anchoring techniques, these vessels are constantly in motion. Thus, riser strings are connected to a moving vessel on top and to a stationary "template" on the sea floor.

Movement of the vessel due to wind, tides, storms, eddy currents and other forces is three dimensional. The rig moves up and down and in a random motion about the well center. This constant movement subjects the riser strings to constant tension, compression and bending. Seawater exerts external pressure on the outer surface and the flow of oil and gas exerts internal pressure. Temperature changes occur with production that can elongate or shorten the riser string and increase these loads. While each of these loads is generally low level compared to the working strength of the materials used, the movement over time can ultimately cause failure due to material fatigue. Over prolonged service, these riser strings may experience significantly higher load levels for short periods such as during hurricanes. While available materials can be selected to resist anticipated static loads for the intended service life, long term cyclic loading and other factors may cause early failures.

Long term exposure to seawater may cause corrosion of the tubular sections and couplings used in riser strings. The free exchange of seawater into the threaded region of the coupling allows the entry of oxygen which promotes corrosion that adversely affects fatigue life. As a preventative measure, tubular sections may be protected with a variety of corrosion resistant coatings. Additionally, sacrificial anodes that are electrically connected between the tubular sections and the connections may be used to provide cathodic protection against corrosion due to prolonged seawater exposure.

Each pin end is externally threaded and the box end is internally threaded. The pin threads are machined into the tubular section and taper from its outer diameter to its end, or the pin face. Each pin end resembles a truncated cone with helical threads around its outside surface. The truncated cone has an outer diameter smaller than the tubular section at the pin face and then tapers out to the fall outer diameter. Threading begins at the pin face and runs out until the thread root diameter exceeds the tubular outer diameter. Thus, threads closest to the pin face and continuing around the pin end for most of the threaded area are known as "perfect" or full-crested threads. The number of these perfect threads is taper dependent.

Beyond the perfect threads, imperfect threads are formed. These are threads with crest diameters that exceed the tubular outer diameter and are no longer full-crested. Imperfect threads run out when the thread root diameter exceeds the tubular outer diameter. The appearance of imperfect threads ranges from near full-crested to barely visible scratches in the outer diameter surface of the tubular section. Pin threads are generally "as machined" and are not coated with any protective material.

Couplings for joining together tubular sections have opposing internally threaded box ends, and generally are larger in diameter than the tubular sections. The thread form and taper of each box are typically the same as those of the pin ends of the tubular sections. Unlike pin threads, box threads are all perfect threads. Additionally, unlike pin threads, box threads are coated with a variety of materials which are typically corrosion resistant and are used to resist thread galling with repeated make-ups and break-outs.

When assembled, there exists a void between the perfect box threads and the mating imperfect pin threads. This void exists at the mouth of the coupling on assembled connections. The "as-machined" imperfect pin threads in the void are exposed to seawater and, in time, experience corrosion pitting. Seawater migrates into the connection to cause corrosion. More specifically, free exchange of seawater into the connection after the connection has reached equilibrium at a sub-sea depth allows entry of oxygen through the imperfectly threaded region. As a result, pinpoint corrosion pitting occurs, significantly reducing the fatigue life of the connection and increasing the risk of early failure in the form of fractures.

Threaded tubular connections are assembled with a variety of lubricating compounds. In addition, couplings often have positive seals intended to prevent internal pressure leaks. Some of these seals also are intended to prevent external leaks. However, during make-up, excess thread lubricant is forced forward toward the center of the coupling and backward toward the coupling face. In the center, lubricating compound that doesn't squeeze out into the inner diameter of the tubular section resides in the threads. After some time, this excess squeezes out of the connection in the other direction toward the coupling face as the connection settles after make-up and reaches equilibrium.

Couplings with external pressure seals, however, can block the exit channel for excess thread compound. As a result, thread compound can be trapped in the threads. If it is trapped in the threads, thread compound can generate significant hydraulic pressure tending to jack the pin away from the box. This can result in significant stresses that may diminish connection performance in service and lead to failures. Thus, there is a need to avoid trapping excess thread compound in a connection with both internal and external seals.

SUMMARY OF THE INVENTION

The present invention overcomes the above problems and disadvantages by providing a threaded coupling with a water exclusion seal system to prevent the free exchange of seawater into the connection through the critical area between the perfect box threads and mating imperfect pin threads. The water exclusion seal system includes three interrelated components: a thread compound relief groove in the coupling inner diameter, a pressure activated resilient seal, and a groove in the coupling inner diameter for the pressure activated resilient seal.

The thread compound relief groove is located in the unthreaded area between the threaded area and each end of the coupling, to provide a reservoir for excess thread compound that is squeezed from the threads during make-up. The thread compound relief groove is dimensioned to provide sufficient volume to store excess thread compound and eliminate any associated hydraulic pressure build-up in the joint during or after make-up, or any negative impact of the thread compound on the seal.

The pressure energized resilient seal is energized when it is squeezed between the tubular outer diameter and a groove in the coupling where the seal is positioned. The seal achieves contact pressure with the tubular outer diameter and the groove to form a seal that prevents free exchange of sea water in the imperfect threaded area of the tapered threaded connection.

The groove for the pressure activated resilient seal is machined into the inner diameter of the coupling between the thread compound relief groove and the end of the coupling. This groove provides an area having a radial distance from the outer diameter of the tubular section that is less than the radial thickness of the seal. The pressure activated resilient seal in this groove is compressed radially between the outer surface of the tubular section and the coupling groove, to provide effective and repeatable sealing if the connection is disassembled and later reassembled.

BRIEF DESCRIPTION OF THE DRAWINGS

The following drawings form part of the present specification and are included to further demonstrate certain aspects of the present invention. The invention may be better understood by reference to one or more of the drawings in combination with the detailed description of specific embodiments presented therein.

FIG. 1 is a cross section view of the claimed invention according to a preferred embodiment thereof.

FIG. 2 is an expanded section view of the thread compound relief groove, seal groove and seal according to the embodiment of FIG. 1.

DETAILED DESCRIPTION OF A PREFERRED EMBODIMENT

Referring to FIG. 1, a pair of tubular sections 11, 12 according to a preferred embodiment of the present invention are shown in cross section connected to coupling 13. In FIG. 1, tubular section 11 is shown in the hand tight position and tubular section 12 is shown in the power tight position with respect to the coupling. The outer diameter of each pipe section and the inner diameter of the coupling have API buttress threads. The dimensions and threadform of API buttress threads are well known to those skilled in the art.

Although the preferred embodiment is shown in an API buttress thread coupling, the water exclusion seal system of the present invention is intended to be used in threaded and coupled connections having other thread forms. In fact, the present invention may be added to any existing threaded and coupled connection to provide the advantages described in this specification.

In a preferred embodiment, external threads on each tubular section are formed on a taper. For example, when API buttress threads are machined on a nominal 10 3/4 inch outer diameter coupling, the thread taper is 3/4 inch per foot. Due to the taper, the outer diameter of the threaded portion of each tubular section is progressively smaller closer to pin face 14, 15 than at locations further from the pin face. On the outer diameter of each casing section 11, 12, perfect or full crested threads 16, 17 are closest to each pin face 14, 15. The pin threads become imperfect threads 18, 19 progressively further from each pin end, and run out when the pin thread root diameter exceeds the outer diameter of the externally threaded tubular section. After the imperfect threads run out, the outer diameter of each tubular section has an unthreaded cylindrical area 20, 21 around its outer circumference.

Coupling 13 includes central section 26 and first and second end sections 22, 23 extending between the central section and first and second ends 24, 25 of the coupling. The central section is unthreaded and is located intermediate the coupling and preferably has a substantially thicker cross section than either of the threaded areas on each end of the coupling. The central section includes first shoulder 27 and second shoulder 28, which preferably are substantially perpendicular to the coupling axis, and annular surface 29 between the two shoulders. Other shoulder angles, however, also may be used in accordance with the present invention. The inside diameter of the central section is approximately equal to the inside diameter of the pipe, and is preferably no less than the inside diameter of the pipe. In a preferred embodiment, stress redirection grooves or thread relief grooves 30, 31 are adjacent each of the shoulders. The present invention also may be used in couplings having one or more metal seals adjacent the central section of the coupling for sealing with each pin face.

Each of the end sections of the coupling includes threaded area 44, 45. The threads are on a taper which preferably matches the taper of the tubular section threads. Two or more different tapers on the threaded areas of the coupling, however, may also be used, For example, the taper of the threaded area near each end may be slightly increased over the taper of the threaded area near the central section of the coupling. In the embodiment shown, the coupling threads are perfect threads. The end sections of the coupling extend beyond the threaded areas, to provide unthreaded areas 40, 41. For example, in a preferred embodiment with a 10¾ inch outer diameter coupling, the unthreaded areas extend 1½ inches beyond each threaded area to each end of the coupling. Zinc electroplate or other corrosion inhibiting and/or anti-galling coatings may be provided on the threaded areas and other inner diameter surfaces of the coupling.

In the present invention, thread compound relief grooves 32, 33 and water exclusion seal grooves 34, 35 are located in unthreaded areas 40, 41 near each end of the coupling. The thread compound relief grooves extend around the inner diameter of the coupling. The thread compound relief grooves are located in the unthreaded areas axially between the termination of the coupling threads and the first and second ends of the coupling. Each thread compound relief groove is dimensioned to provide a reservoir for thread compound and has a volume sufficient to store excess thread compound that is squeezed from the threaded area toward the ends of the coupling during make-up.

The dimensions of the thread compound relief groove may be determined by calculating the volume of excess thread compound in the gap between the pin and box threads and the volume of excess thread compound observed at final, or power tight, make-up. With a 10¾ inch outside diameter coupling, the volume of the gap between the run-out threads on the pin and the perfect threads on the box was calculated as 0.64 cubic inches, and a ³⁄₁₆ inch diameter bead of thread compound also was observed around the coupling-pipe interface which was calculated to have a volume of 0.95 cubic inches. The sum of these volumes, i.e., the excess thread compound volume, was used to determine the minimum volume for the thread compound relief groove. The thread compound relief groove is dimensioned to have a volume greater than the volume of excess thread compound in the connection at final-make-up, including thread compound in the gap between the threads and thread compound observed at the coupling-pipe interface.

In a preferred embodiment, the thread compound relief groove has a depth no greater than ⅓ of the wall thickness of the coupling at or near the end of the coupling. For example, with 10¾ inch outside diameter couplings having wall thickness of approximately 0.55 inches on radius, the thread compound relief groove has a depth of approximately 0.14 inches on radius. In a preferred embodiment, walls 51, 52 of the thread compound relief groove are counter bored and have an angle of between 45 and 50 degrees with respect to the coupling axis. The angled walls help prevent stress risers due to bending of the coupling ends during or after make-up. Angles other than 45 to 50 degrees, however, also may be used in accordance with the present invention. In a most preferred embodiment for 10¾ inch outside diameter pipe coupling, the walls of the thread compound relief groove are at 47 degrees to the coupling axis and each groove has a volume of slightly over 2 cubic inches.

Water exclusion seal grooves 34, 35 extend around the inner diameter of the coupling and are located axially in the unthreaded areas between the thread compound relief grooves and the first and second ends of the coupling. Each water exclusion seal groove is machined into the inner diameter of the coupling adjacent the end of the coupling to provide a precise known radial clearance from the unthreaded cylindrical surfaces 20, 21 of the tubular sections in the hand tight and/or power tight positions. By controlling the radial clearance between the seal groove and the unthreaded cylindrical surfaces of the tubular sections, the amount of radial compression of the seal can be controlled. In a preferred embodiment, each water exclusion seal groove is dimensioned so that its depth is approximately ½ of the coupling wall thickness. For example, in a 10 ¾ inch outer diameter coupling, each seal groove has a depth of approximately 0.30 inches on radius and the coupling wall thickness is approximately 0.55 inches on radius.

Seals 36, 37 are annular seals that are positioned in the water exclusion seal grooves. The seals may be formed from any elastomeric material, i.e., made from any of various elastic substances. The term elastomeric as used in the specification and claims of this application is intended to include any natural or synthetic material having elastic properties including rubbers, plastics, polymers, etc. Each of the seals is compressed radially between the water exclusion seal groove and the unthreaded cylindrical surface of the tubular section. This radial compression pressure-energizes the seal. Additionally, seawater pressure external to the coupling enhances the seal. Seawater urges the seal axially against the wall of the seal groove toward the center of the coupling, increasing contact pressure of the seal with the unthreaded cylindrical area of the tubular section and with the coupling, thereby enhancing the seal. Internal pressure in the coupling also enhances the seal by urging the lips of the seal radially against the seal groove and outer diameter of the tubular section.

In a preferred embodiment, sealing rings shown in U.S. Pat. No. 4,174,846 assigned to Parker-Hannifin Corporation of Cleveland, Ohio are used. These seals are marketed under the name Poly-Pak®. These sealing rings include a U cup or housing 39 made of resilient or elastomeric material such as polyurethane, having a rectilinear base 46 and a pair of lips 47, 48 forming a cavity therebetween. However, it is preferred that lip 47 positioned on groove 34 be thinner in cross section than lip 48 facing the machined surface of the tubular section. In this seal, expander ring 38, preferably made of a synthetic rubber, is mounted within the cavity of the U cup or housing. The expander ring faces the center of the coupling. The expander ring may be an O-ring with a circular cross section, although other cross section shapes for the expander ring may be used. The rectilinear base is dimensioned for positioning the seal in the water exclusion seal groove of the coupling. In a preferred embodiment, the seal has an axial length slightly less than the axial length of the seal groove so that there is a slight gap between the seal and the side wall of the seal groove.

The seal of the present invention should have a radial thickness slightly greater than the depth of the seal groove. The seal should have radial thickness sufficient to protrude or extend from the seal groove sufficiently to contact the outer diameter of the unthreaded cylindrical area of the tubular section when the coupling reaches the hand tight position. As a result, when it reaches the hand tight position, the seal is squeezed radially between unthreaded cylindrical surface 20, 21 of the tubular section and water exclusion seal groove 34, 35. The radial compression energizes the seal. Contact pressure between the seal and the outer diameter of the tubular section, and between the seal and groove, maintains a seal that prevents free exchange of seawater past the imperfect threaded area of the tubular sections. Without the free exchange of seawater, little or no oxygen can enter the critical area of the connection and detrimental corrosion is greatly reduced or eliminated.

In a preferred embodiment, as the elastomeric housing is compressed radially, so is the O-ring, thereby energizing the O-ring to push back against the housing. The O-ring pressure keeps the housing in positive intimate contact with the groove and unthreaded portion of the outer diameter of the tubular section during differential pin/box movement.

In a preferred embodiment, the unthreaded cylindrical area around the outer circumference of the tubular section is machined smooth. However, it is not necessary that the unthreaded cylindrical area be a fully machined surface. The present invention also may be used advantageously if surface irregularities (i.e., burrs) are removed or reduced sufficiently to provide a clean and smooth surface for engagement of the pressure energized resilient seal, and for effective sealing consistent with elastomeric sealing materials. This promotes effective sealing and repeatable sealing if the connection is disassembled and later reassembled without damage to the seal.

The unthreaded cylindrical area of the tubular section should be dimensioned to have an outer diameter sufficient to radially compress the seal when the connection reaches the hand-tight position or power-tight position. For example, after machining, the outer diameter of the tubular section will be slightly smaller than its mill finished outer diameter. Nominal 10¾ inch outer diameter tubular sections commonly have a mill finished outer diameter slightly over 10¾ inches, and the unthreaded cylindrical area may be machined before threading to an outer diameter of 10.766 inches, for example, with tolerances limiting the maximum machined outer diameter to 10.776 inches. Other outer diameter dimensions and tolerances also may be used in accordance with the present invention.

In FIG. 1, the invention is shown with tubular section 11 in the hand tight position. Pin face 14 has not reached shoulder 27. At this hand tight position, the lips of pressure energized resilient seal 36 are compressed radially to form a seal. Also shown in FIG. 1, casing section 12 is in the power tight position. From the hand tight to the power tight position, additional thread compound is squeezed from the threaded area into thread compound relief grooves 32, 33. At final make-up, pin face 15 has touched shoulder 28, and the pressure energized resilient seal remains compressed radially to form a seal that will prevent free exchange of seawater into the connection. The thread compound that exited the threads remains in the relief groove which acts as a reservoir for all thread compound squeezed through the threads, and as a result the pressure activated resilient seal will not be disturbed or negatively affected by thread compound during or after make-up.

Although the present invention will not allow water into the connection at pressures up to approximately 5000 psi, at greater pressures the invention also will inhibit corrosion because it will not allow free exchange of seawater after the connection has reached equilibrium. For example, if some seawater enters the coupling before the coupling is positioned subsea and reaches equilibrium at a specific depth, this is limited and does not cause a detrimental amount of corrosion pitting. Once it reaches equilibrium, however, the invention will not allow free exchange of seawater and the introduction of additional oxygen into the connection.

Another advantage of the present invention is that it provides an alternative to welded connections, particularly with alternative materials such as high strength steels. By preventing the free exchange of seawater into the connection after the connection reaches equilibrium at a subsea depth, the present invention prevents the introduction of additional oxygen into the connection and the corrosion caused by that oxygen.

The present invention has been described and illustrated with respect to a specific embodiment. It will be understood to those skilled in the art that changes and modifications may be made without departing from the spirit and scope of the invention as set forth in the appended claims.

What is claimed is:

1. A coupling for joining together two tubular sections, each tubular section having an end and an outer diameter with an unthreaded area and a threaded area between the unthreaded area and the end, the coupling having an inner diameter with an unthreaded central section having first and second opposing shoulders, and first and second end sections joined to the unthreaded central section, the first and second end sections having first and second ends respectively, comprising:

(a) each of the first and second end sections of the coupling having an internally threaded area adjacent the central section and an unthreaded area between each internally threaded area and each end of the coupling; a thread compound relief groove in each unthreaded area between each internally threaded area and each end of the coupling, and a seal groove in each unthreaded area between each thread compound relief groove and each end of the coupling; and (b) a pressure energized resilient seal positioned in each of the seal grooves, each seal forming a seal between the unthreaded area of each tubular section and the unthreaded area of each end section, each seal being compressed radially between the unthreaded area of the tubular section and the unthreaded area of the end section.

2. The coupling of claim 1 wherein each pressure energized resilient seal comprises an O-ring housed in an elastomeric housing.

3. The coupling of claim 1 wherein each internally threaded area is threaded on a taper.

4. The coupling of claim 1 wherein there is a gap between the threads of each externally threaded pipe end and the threads of each threaded area of the coupling, each thread compound relief groove having a volume greater than the volume in the gap.

5. The coupling of claim 1 wherein thread compound is applied to at least some of the threads of the threaded area of the coupling, the thread compound relief groove dimensioned to have a volume greater than the volume of excess thread compound in the threads.

6. The coupling of claim 1 wherein the pressure energized resilient seal has a greater radial thickness than the seal groove.

7. An improved coupling for repeatedly joining together two tubular sections, each tubular section having a tapered externally threaded portion and an unthreaded cylindrical portion adjacent the tapered externally threaded portion, the coupling having a substantially uniform outer diameter, first and second end sections, each end section having tapered internal threads, and an unthreaded center section spaced between the first and second ends of the coupling, the center section having an inner diameter substantially the same as the inner diameter of the threaded portion of each tubular section and having shoulders on each side thereof, wherein the improvement comprises:

(a) each of the first and second end sections of the coupling having an unthreaded area between the tapered internal threads and each end of the coupling;

(b) a thread compound relief groove and a seal groove in the unthreaded areas of each end section; and (c) a pressure energized annular elastomeric seal positioned in each seal groove, the seal being compressed radially between each unthreaded area at each end of the coupling and each unthreaded cylindrical portion of each tubular section.

8. The improved coupling of claim 7 wherein the seal includes an O-ring.

9. The improved coupling of claim 7 further comprising an unthreaded stress redirection groove between the internal threads of the coupling and the center section.

10. The improved coupling of claim 7 wherein the seal has an internal cavity that expands in response to pressure to enhance the seal.

11. An improved coupling having first and second ends for repeatedly joining together externally threaded tubular sections wherein the improvement comprises:

(a) an unthreaded area at each end of the coupling, a seal groove in the unthreaded area, an elastomeric annular seal in the groove, and a thread compound relief groove in the unthreaded area adjacent the groove; and (b) each of the elastomeric annular seals having two components forming a pressure activated radial seal between each externally threaded tubular section and the unthreaded area at each end of the coupling.

12. The improved coupling of claim 11 further comprising an unthreaded center section between the first and second ends.

13. The improved coupling of claim 11 wherein the elastomeric annular seal comprises an O-ring housed in an elastomeric U cup.

14. The improved coupling of claim 11 wherein thread compound is in the gap between the threads of the pipe sections and the coupling, the thread compound relief groove having greater volume than the gap.

* * * * *